UNITED STATES PATENT OFFICE.

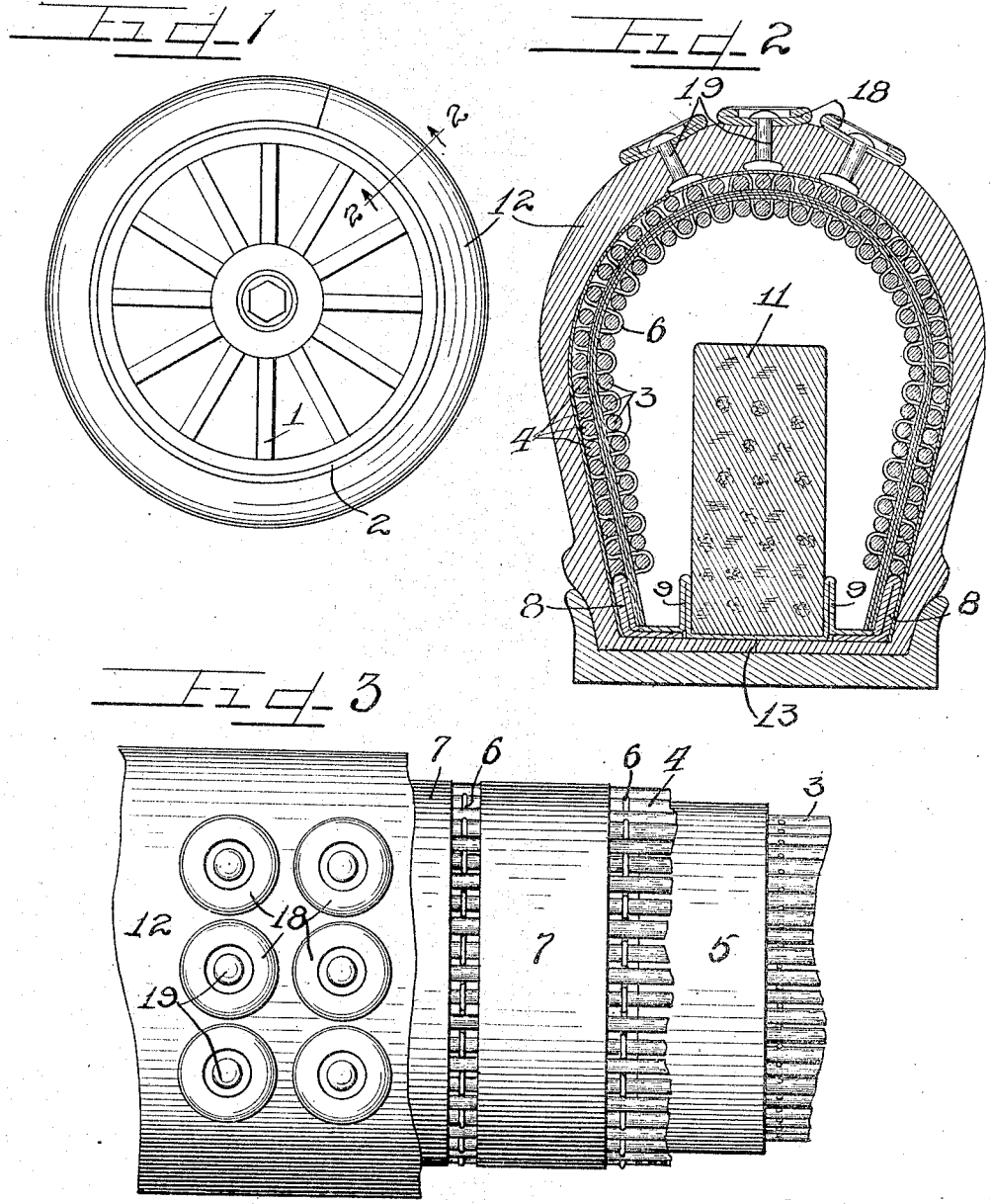

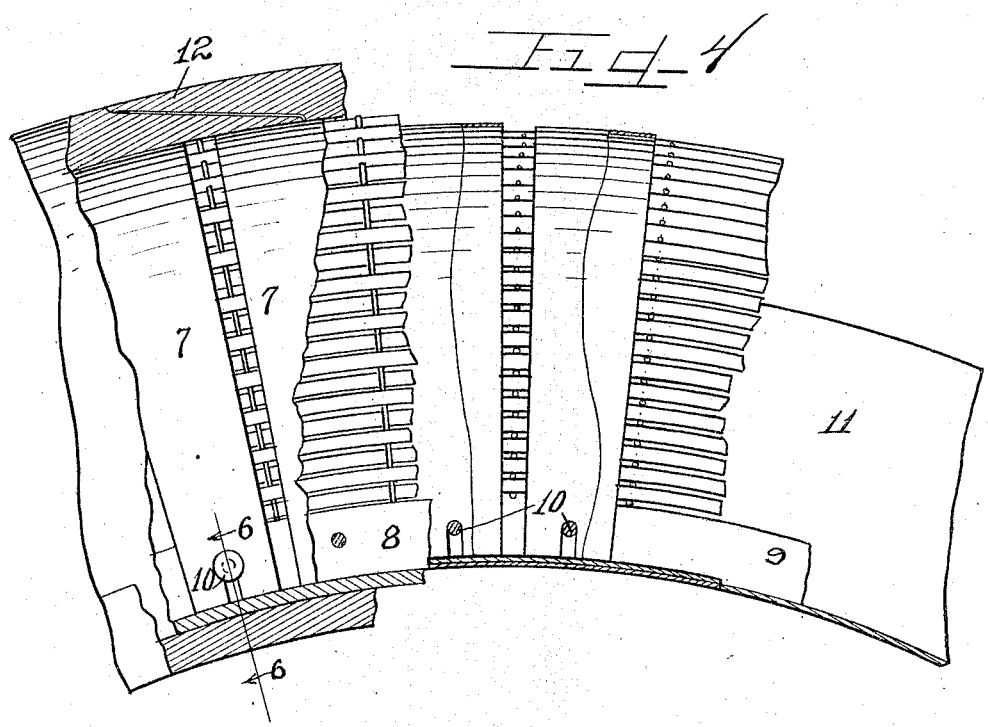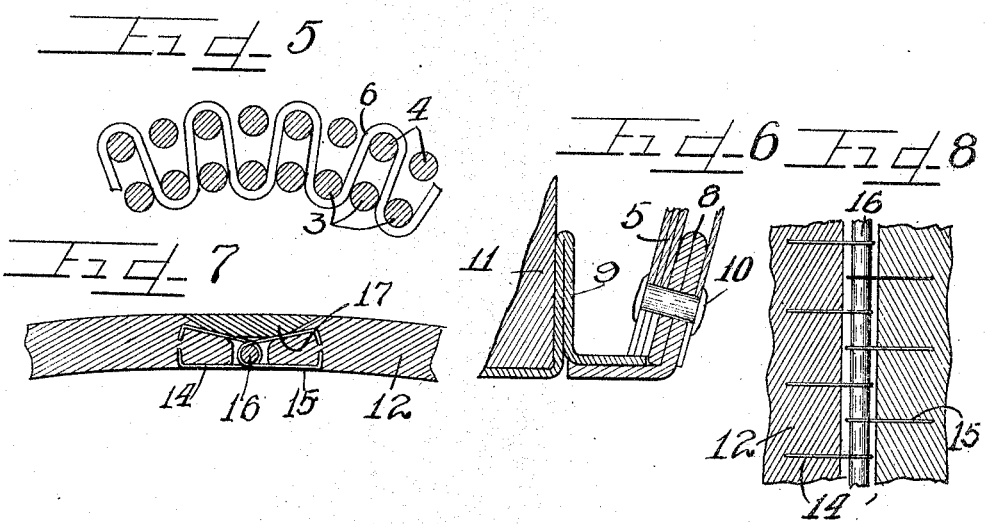

NELS P. SJOBRING, OF CHICAGO, ILLINOIS.

ARMORED TIRE.

1,237,398.     Specification of Letters Patent.     Patented Aug. 21, 1917.

Application filed August 2, 1915. Serial No. 43,103.

*To all whom it may concern:*

Be it known that I, NELS P. SJOBRING, a citizen of the United States, and a resident of the city of Chicago, in the county of Cook and State of Illinois, have invented certain new and useful Improvements in Armored Tires; and I do hereby declare that the following is a full, clear, and exact description of the same, reference being had to the accompanying drawings, and to the numerals of reference marked thereon, which form a part of this specification.

This invention relates to an improved type of tire construction wherein all the easy resiliency of the ordinary pneumatic tire is obtained without the use of air under pressure, wherein the reinforcing members which do not only act to resiliently sustain the load carried by the tire, but further act as an armor to resist injury to the tire.

It is an object therefore of this invention to provide a tire constructed to sustain heavy loads in a resilient manner similar to a penumatic tire, and yet without the use of air under pressure, so that in the event of leakage or puncture of the tire casing, no harm or injury can arise.

It is also an object of this invention to construct a tire employing a stiff resilient wire wound in a series of coils with the coils closely adjacent one another and interlaced by auxiliary means and held secured by metallic resilient bands and invested with a rubber or composition covering to protect and inclose the same and obviate noise in operation.

It is also an object of this invention to construct a tire having a metallic body of flexible nature capable of sustaining great loads, and invested with a rubber tread or covering to insure noiseless operation of the tire on the road and as well to inclose and protect the metallic structure.

It is also an object of this invention to construct a tire, the body of which is built up of a plurality of coils of wire confined together and invested with a removable covering of rubber, fabric or composition, to seal the same whereby a filler of lubricant may be placed within the tire for the metallic members when said covering is removed, said metallic members acting resiliently to resist deformation of the tire, thus giving all the easy riding qualities of a pneumatic tire without the use of air under pressure.

It is also an object of this invention to construct a tire built up of a plurality of coils of wire formed by a single wire wound longitudinally around the tire to form a double layer of coils suitably interlaced and confined by resilient bands having sliding connection with a rim, and invested with a yieldable material such as rubber, composition or the like, and said rim provided on its outer periphery with a resilient core to assist the wire coil members in resisting undue deformation of the tire.

It is furthermore an object of this invention to construct a tire consisting of a plurality of coils of wire wound from a single strand and suitably connected together to form a substantial metallic resilient load sustaining body.

It is finally an object of this invention to construct an armored tire having a metallic load sustaining body which may be cheaply constructed and not requiring use of air under pressure.

The invention (in a preferred form) is illustrated in the drawings and hereinafter more fully described.

In the drawings:

Figure 1 is a side elevation of a tire embodying the principles of my invention mounted upon a wheel.

Fig. 2 is a transverse section taken on line 2—2 of Fig. 1.

Fig. 3 is a fragmentary plan view of a portion of the tire broken away at different points to show the interior construction.

Fig. 4 is a fragmentary side view of the tire broken away in a similar manner to that shown in Fig. 3, to show the interior construction of the tire.

Fig. 5 is an enlarged fragmentary detail section illustrating the association of the wire coils with one another.

Fig. 6 is an enlarged fragmentary detail section taken on line 6—6 of Fig. 4.

Fig. 7 is a detail section of the tire taken at the junction of the ends of the outer covering or investment.

Fig. 8 is a fragmentary top view of the retaining means at the junction of said investment of the tire.

As shown in the drawings:

The reference numeral 1, indicates as a whole a wheel of any suitable type or construction provided with a demountable split rim 2, of any desired type the details of construction, however, are not shown and mounted in said rim 2, is a tire embodying the principles of my invention. The metallic body of the tire consists of inner and outer coils wound longitudinally around and from a single strand of wire, the inner coil being denoted by the reference numeral 3, and the outer coil by the reference numeral 4. Interposed between said inner and outer coils 3 and 4, at points around the tire, are groups of resilient metal straps 5, each group comprising three straps, as clearly shown in section in Figs. 2 and 6, and intermediate each of said strap groups 5, is a wire lacing 6, which serves to hold said coils 3 and 4, connected to one another. A plurality of single resilient retaining straps 7, are disposed about the outer coils 4, directly over said inner straps 5.

An interior rim member folded to form exterior flanges 8, and interior flanges 9, is provided for attachment of said metal straps 5 and 7, thereto, and for this purpose the extremities of said straps are slotted and engage pins 10 secured through said outer flanges 8. Secured in the groove or channel formed between the inner flanges 9, is a resilient core element 11, preferably constructed of cork, although of course, any suitable material may be used for the purpose. The wire coils are provided with an outer investment of rubber, composition, fabric or other suitable material 12, of substantially a sealing nature and having an inner circumferential gap 13 to permit removal of the investment 12, in order that the interior of the tire may be lubricated to permit easy action of the resilient coils and straps in resisting deflection. The investment 12, is slit transversely along its outer periphery, and the ends thereof are adapted to be connected by merely vulcanizing the same when in overlapped relation, such as shown in Fig. 4, or by other means hereinafter described.

Secured in the ends or extremities of said investment, as shown in Figs. 7 and 8, are staples 14 and 15, adapted to extend between one another, as shown in Fig. 8, and to receive a pin 16, inserted therethrough as shown in Figs. 7 and 8, to hold the investment member 12, securely around the wire coils. At the junction of the meeting ends of said investment member or strip 12, the material is cut away or formed at an angle as clearly shown in Fig. 7, to receive a strip of similar material 17, inserted therein which may then be vulcanized thereto to conceal and cover the connecting members 14, 15, and 16. Secured on the outer surface or tread of the investment 12, are a plurality of disks 18, affixed thereto by rivets 19, or other suitable means.

The operation is as follows:

The body of the tire formed by the inner and outer coils 3 and 4, and associated with the respective straps or bands 5 and 7, and mounted on the interior rim 8—9, may be used as so constructed if desired without the investment member 12, but due to the extreme conditions to which tires are subjected, it is preferable to inclose the mechanical elements in the removable investment 12 thus obviating noisy operation thereof and as well permitting the mechanical elements to be oiled and lubricated to facilitate their operation when said investment is removed.

The springy construction of the body of the tire gives the same easy riding qualities of a pneumatic tire, and it is, of course, unnecessary to use air under pressure for the purpose. The auxiliary core member 11, also of resilient material, is provided to reinforce the tire if for any reason the same should be unduly deformed.

I am aware that various details of construction may be varied through a wide range without departing from the principles of this invention, and I therefore do not purpose limiting the patent granted otherwise than necessitated by the prior art.

I claim as my invention:

1. In a tire of the class described, a plurality of coils disposed one within the other and wound circumferentially around longitudinally of the tire, groups of retaining means for said coils, and an investment of material around the exterior thereof.

2. In a tire of the class described, a load sustaining body comprising inner and outer coils wound longitudinally circumferentially around from a single strip of wire, means interlacing said coils for retaining the same associated with one another, and mechanism for connecting the same to the rim of a wheel.

3. In a device of the class described, a tire comprising a plurality of longitudinally disposed concentric coils of wire all formed from the same wire, means interlacing said coils one to another, resilient straps interposed between said coils extending transversely thereof, an interior rim member to receive said straps slidably attached thereto, and an outer investment member secured detachably around said coils to seal the same therein to permit introduction of lubricant around said coils.

4. A resilient tire of the class described, comprising a plurality of coils of wire wound longitudinally around the tire to form the body thereof, strap members certain ones thereof interposed between said coils and others disposed around the exterior thereof, means for attachment of said strap members to hold said coils confined to the shape of the tire desired, and an investment member fitting around the exterior of said coils and strap members.

5. In a resilient tire of the class described, a plurality of coils of wire wound one within the other longitudinally and circumferentially around and adjacent one another, means interlacing said coils to hold the same associated with one another, an investment member around said coils, and an inner resilient core member inclosed within said coils to resist undue deflection thereof.

6. In a tire of the class described, a plurality of coils of wire one surrounding the other, groups of slotted retaining straps, means engaging in said slots to hold said straps around said coils, and an investment of material around the exterior of said straps.

7. In a tire of the class described, concentric coils formed from a unitary wire, retaining means therefor, and interlacing means disposed therebetween for holding said coils connected to one another.

8. In a tire of the class described, wire coils disposed one within the other, slotted straps for retaining the same in position, wires interlacing said coils one to another, and flanged means adapted to receive said straps attached thereto.

9. In a tire of the class described, coaxial wire coils disposed one within the other, means for retaining and holding the same associated with one another, a core member, and flanged means for supporting said means and said member.

10. In a tire of the class described, wire coils one surrounding the other, means for retaining and holding the same associated with one another, a resilient core member, an interior flanged rim for supporting said means and said member, and an investment of material fitting around the exterior thereof.

In testimony whereof I have hereunto subscribed my name in the presence of two subscribing witnesses.

NELS P. SJOBRING.

Witnesses:
CHARLES W. HILLS, Jr.,
EARL M. HARDINE.

Copies of this patent may be obtained for five cents each, by addressing the "Commissioner of Patents, Washington, D. C."